US008508096B2

(12) United States Patent
Kang et al.

(10) Patent No.: US 8,508,096 B2
(45) Date of Patent: Aug. 13, 2013

(54) STATOR CORE AND SPINDLE MOTOR HAVING THE SAME

(75) Inventors: Dae Lyun Kang, Gyunggi-do (KR); Dong Yeon Shin, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 84 days.

(21) Appl. No.: 13/064,949

(22) Filed: Apr. 27, 2011

(65) Prior Publication Data

US 2011/0278965 A1 Nov. 17, 2011

(30) Foreign Application Priority Data

May 11, 2010 (KR) .................. 10-2010-0044195

(51) Int. Cl.
*H02K 5/22* (2006.01)
(52) U.S. Cl.
USPC ....... 310/216.006; 310/216.066; 310/216.067
(58) Field of Classification Search
USPC ......... 310/43–45, 216.006, 216.066, 216.067
See application file for complete search history.

(56) References Cited

U.S. PATENT DOCUMENTS

| | | | | |
|---|---|---|---|---|
| 5,668,427 A | * | 9/1997 | Morita | 310/216.074 |
| 5,822,150 A | * | 10/1998 | Kelsic | 360/98.07 |
| 5,930,076 A | | 7/1999 | Morita | |
| 6,127,760 A | * | 10/2000 | Nagasaki et al. | 310/216.074 |
| 6,455,961 B1 | * | 9/2002 | Higuchi | 310/67 R |
| 2002/0050749 A1 | | 5/2002 | Higuchi | |
| 2004/0080232 A1 | | 4/2004 | Gilliland et al. | |
| 2004/0108782 A1 | | 6/2004 | Enomto et al. | |
| 2007/0046130 A1 | | 3/2007 | Enomoto et al. | |
| 2009/0096303 A1 | | 4/2009 | Takaki et al. | |

FOREIGN PATENT DOCUMENTS

| | | |
|---|---|---|
| CN | 1221066 C | 6/2005 |
| JP | 2004-153977 | 5/2004 |
| JP | 2007-68330 | 3/2007 |
| JP | 2009-100540 | 5/2009 |
| KR | 10-0640755 | 10/2006 |
| KR | 10-2007-0092826 | 9/2007 |

OTHER PUBLICATIONS

Korean Office Action issued May 11, 2011 in corresponding Korean Patent Application 10-2010-0044195.
Chinese Office Action issued Mar. 21, 2013 for corresponding Chinese Application No. 201110124911.1.

* cited by examiner

*Primary Examiner* — Dang Le

(57) ABSTRACT

There is provided a stator core including a core back having an opening such that the core back is fixed to a stationary member by being pressed and fitted thereto; and a plurality of teeth portions being protruded from the core back in a radial direction, each teeth portion including a winding recess around which a coil is wound, wherein the core back and the teeth portions are formed by a sintering process. Since the coil is wound around the winding recess, the height of the wound coil can be reduced.

8 Claims, 6 Drawing Sheets

STATOR CORE AND SPINDLE MOTOR HAVING THE SAME

CROSS-REFERENCE TO RELATED APPLICATIONS

This application claims the priority of Korean Patent Application No. 10-2010-0044195 filed on May 11, 2010, in the Korean Intellectual Property Office, the disclosure of which is incorporated herein by reference.

BACKGROUND OF THE INVENTION

1. Field of the Invention

The present invention relates to a stator core and a spindle motor having the same, and more particularly, to a stator core with a coil being wound therearound, allowing for electromagnetic interaction, and a spindle motor having the same.

2. Description of the Related Art

In general, a spindle motor, installed inside a disk drive, rotates a disk so that an optical pickup unit can read data recorded on the disk.

Meanwhile, disk drives are used in portable multimedia devices such as laptop computers that are easily portable and may be used in any place at any time. With the current trend for the miniaturization of portable multimedia devices, manufacturers have been attempting to achieve greater thinness of disk drives.

A stator core, which is currently used in a spindle motor installed in a disk drive, is formed such that several core sheets made of silicon steel are individually pressed and stacked, an insulating film is formed thereon and then a coil is wound therearound. Electromagnetic force generated by applying a current to the wound coil is used as a source for the rotating torque of the spindle motor.

Further, in order to make the disk drive thinner, manufacturers seek to make the spindle motor thinner.

Therefore, there is a need for techniques to allow for the thinness of the spindle motor, that is, the thinness of components constituting the spindle motor, e.g., a stator and a rotor.

SUMMARY OF THE INVENTION

An aspect of the present invention provides a stator core reducing the height of a wound coil and a spindle motor having the same.

An aspect of the present invention also provides a stator core allowing for variations in the shape thereof and a spindle motor having the same.

An aspect of the present invention also provides a stator core facilitating the winding of a coil and a spindle motor having the same.

According to an aspect of the present invention, there is provided a stator core including: a core back having an opening such that the core back is fixed to a stationary member by being pressed and fitted thereto; and a plurality of teeth portions being protruded from the core back in a radial direction, each teeth portion including a winding recess around which a coil is wound, wherein the core back and the teeth portions are formed by a sintering process.

The core back may have a receiving recess allowing a pulling magnet mounted therein to be disposed around the opening, the pulling magnet preventing a lifting of a rotor.

The coil wound around the winding recess may have a height lower than the pulling magnet mounted in the receiving recess.

The winding recess may have side surfaces inclined from a bottom surface towards an outer surface of the teeth portion in order to facilitate the winding of the coil.

The winding recess may have side surfaces disposed at right angles with relation to a bottom surface in order to prevent the wound coil from being separated.

The winding recess may have a series of coil recesses formed in a bottom surface thereof such that the coil may be wound to be inserted into the coil recess.

According to another aspect of the present invention, there is provided a spindle motor including: a base plate; a stationary member fixed to the base plate; and a stator core. The stator core includes a core back having an opening such that the core back is fixed to the stationary member by being pressed and fitted thereto; and a plurality of teeth portions being protruded from the core back in a radial direction, each teeth portion including a winding recess around which a coil is wound, wherein the core back and the teeth portions are formed by a sintering process.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Moreover, detailed descriptions related to well-known functions or constitutions will be ruled out in order not to unnecessarily obscure subject matters of the present invention.

First of all, a stator core according to an exemplary embodiment of the present invention will be described.

Figure 1:
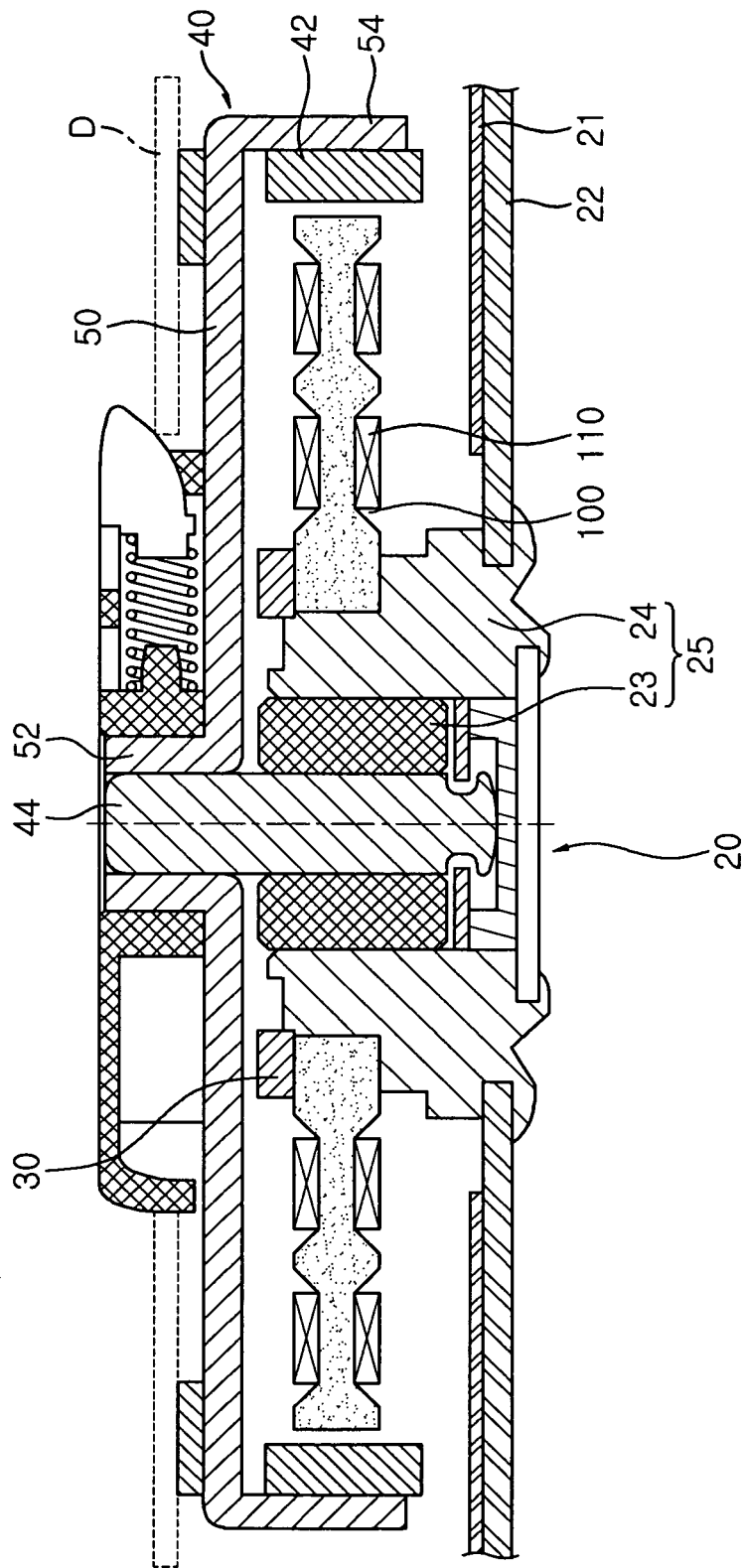
FIG. 1 is a cross-sectional view illustrating a spindle motor having a stator core according to an exemplary embodiment of the present invention.
Figure 2:
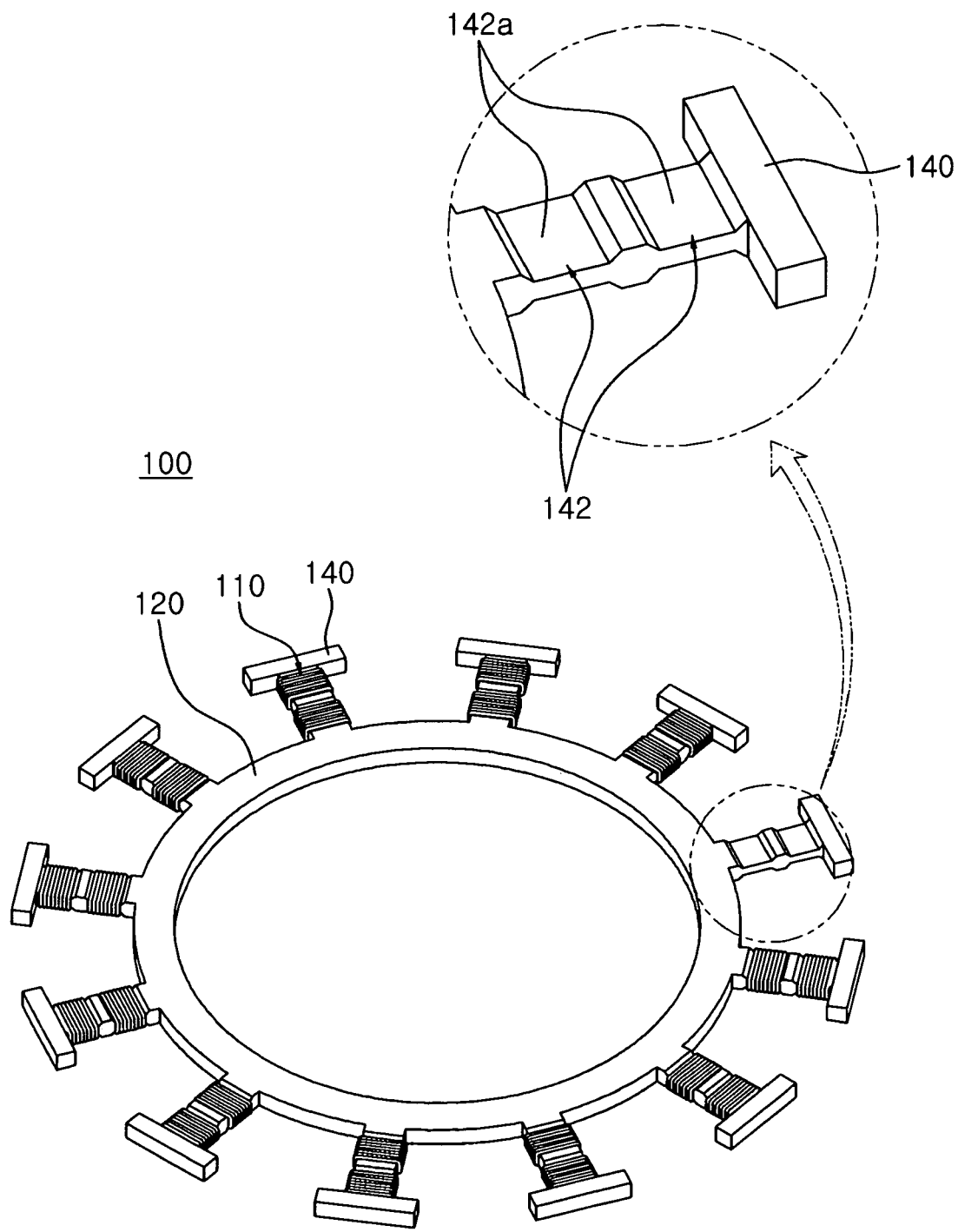
FIG. 2 is a perspective view illustrating a stator core according to an exemplary embodiment of the present invention.

FIG. 1 is a cross-sectional view illustrating a spindle motor having a stator core according to an exemplary embodiment of the present invention. FIG. 2 is a perspective view illustrating a stator core according to an exemplary embodiment of the present invention.

With reference to FIGS. 1 and 2, a stator core 100 according to an exemplary embodiment of the invention includes a core back 120 and teeth portions 140.

The core back 120 has an opening such that the core back 120 is fixed to a stationary member 25 by being pressed and fitted thereto. As an example, the opening, to which the stationary member 25 is pressed and fitted, may be positioned at the center of the core back 120. The core back 120 may have the shape of a ring.

However, the shape of the core back 120 and the position of the opening are not limited thereto, and may be modified in various manners. That is, the core back 120 and the opening may be modified so as to have various shapes, such as a square, a hexagon, or an octagon, according to the shape of the stationary member 25.

The plurality of teeth portions 140 may be protruded from the core back 120 in a radial direction. Each teeth portion 140 includes a winding recess 142 around which a coil 110 is wound.

Here, the radial direction may refer to a direction from an inner circumferential surface of the ring-shaped core back 120 towards an outer circumferential surface thereof or from the outer circumferential surface towards the inner circumferential surface. That is, the radial direction may refer to a direction from the stationary member 25 towards an end of the teeth portion 140 or from the end of the teeth portion 140 towards the stationary member 25.

Meanwhile, since the coil 110 is wound around the winding recess 142 of the teeth portion 140, the height of the coil 110 being wound around the stator core 100 may be reduced. That is, as compared with a case in which a coil is wound around a teeth portion that does not include a winding recess, the stator core 100 including the winding recess 142 according to this embodiment may reduce the height of the wound coil 110.

As an example, the coil 110 may be wound around the inside of the winding recess 142, and thus the height of the wound coil 110 may be reduced.

The winding recess 142 is inclined towards an outer surface of the teeth portion 140 from a bottom surface 142a of the winding recess 142 so as to facilitate the winding of the coil 110.

That is, the winding recess 142 is inclined towards upper and lower surfaces of the teeth portion 140 from the bottom surface 142a of the winding recess 142 such that the coil 110 may be more easily wound around the inside of the winding recess 142.

Further, since the winding recess 142 is inclined towards the upper and lower surfaces of the teeth portion 140 from the bottom surface 142a, this may prevent the wound coil 110 from being separated from the winding recess 142.

Meanwhile, the core back 120 and the teeth portion 140 are formed by a sintering process, and accordingly, the winding recess 142 of the teeth portion 140 may be formed more easily.

That is, as compared with a case in which several core sheets made of silicon steel are individually pressed and then stacked, the core back 120 and the teeth portion 140 are formed by the sintering process so that the winding recess 142 may be formed more easily.

In addition, the sintering process may facilitate variations in the shape of the winding recess 142. That is, the winding recess 142 may be formed so as to be continuous or to be divided into plural parts, and the shape of the winding recess 142 may be freely modified.

As described above, in the stator core 100 according to the embodiment of the invention, the coil 110 is wound around the winding recess 142 so that the height of the wound coil 110 may be reduced.

The winding recess 142 is inclined towards the upper and lower surfaces of the teeth portion 140 so that the coil 110 may be more easily wound around the inside of the winding recess 142 during the winding of the coil 110. Further, this may prevent the wound coil 110 from being separated from the winding recess 142.

In addition, in the stator core 100 according to the embodiment of the invention, the core back 120 and the teeth portion 140 are formed by the sintering process so that the shapes thereof may be freely modified. Further, it may be easier to form the winding recess 142 in the teeth portion 140.

Meanwhile, the elements designated by reference numerals, which are shown but not explained in FIG. 1, will be described in detail in relation to a spindle motor to be described below.

Hereinafter, a stator core according to another exemplary embodiment of the present invention will be described.

Meanwhile, in the explanation of a stator core according to another exemplary embodiment of the invention, a detailed description of the same elements as described in the stator core according to the above-described embodiment will be omitted and be substituted therewith.

Figure 3:
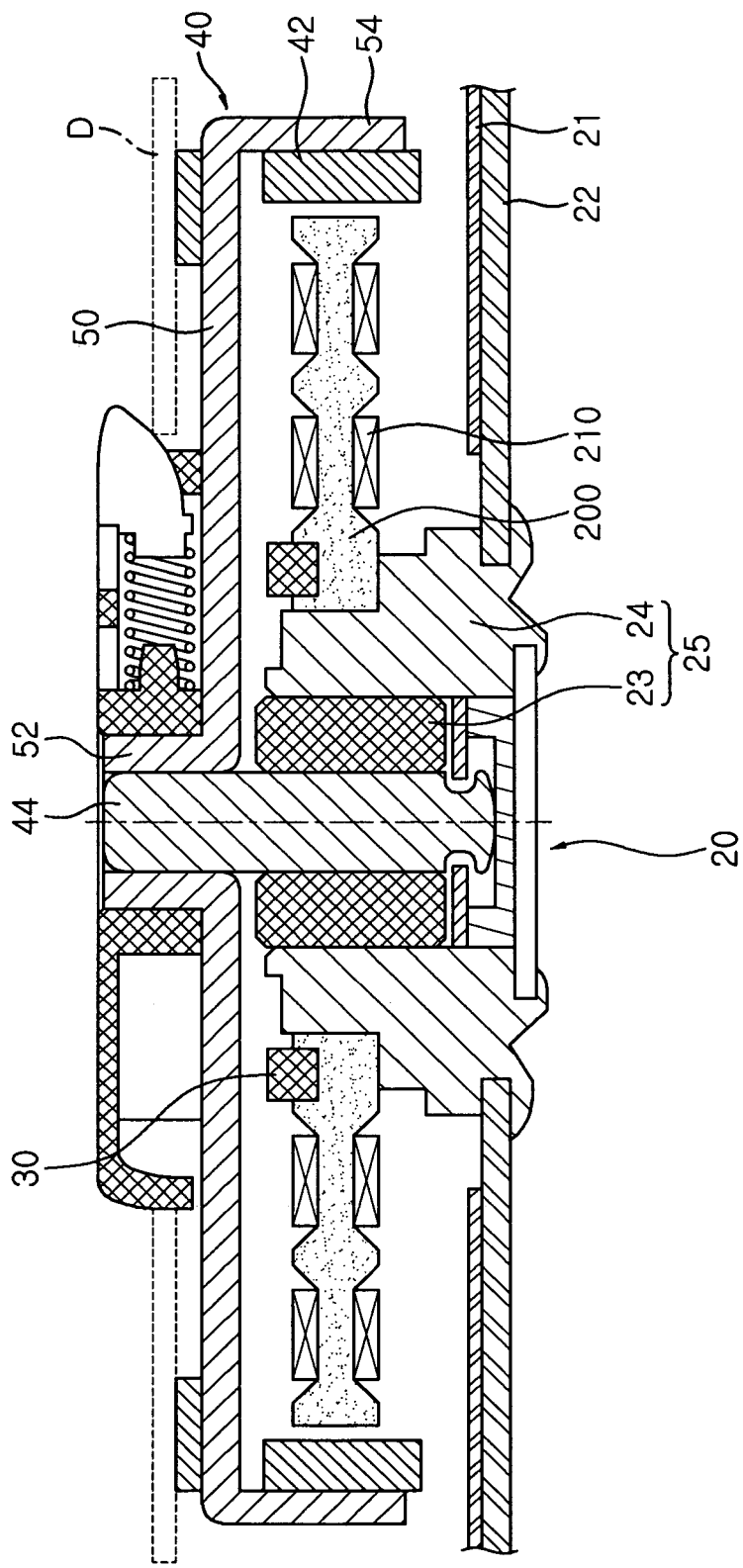
FIG. 3 is a cross-sectional view illustrating a spindle motor having a stator core according to another exemplary embodiment of the present invention.
Figure 4:
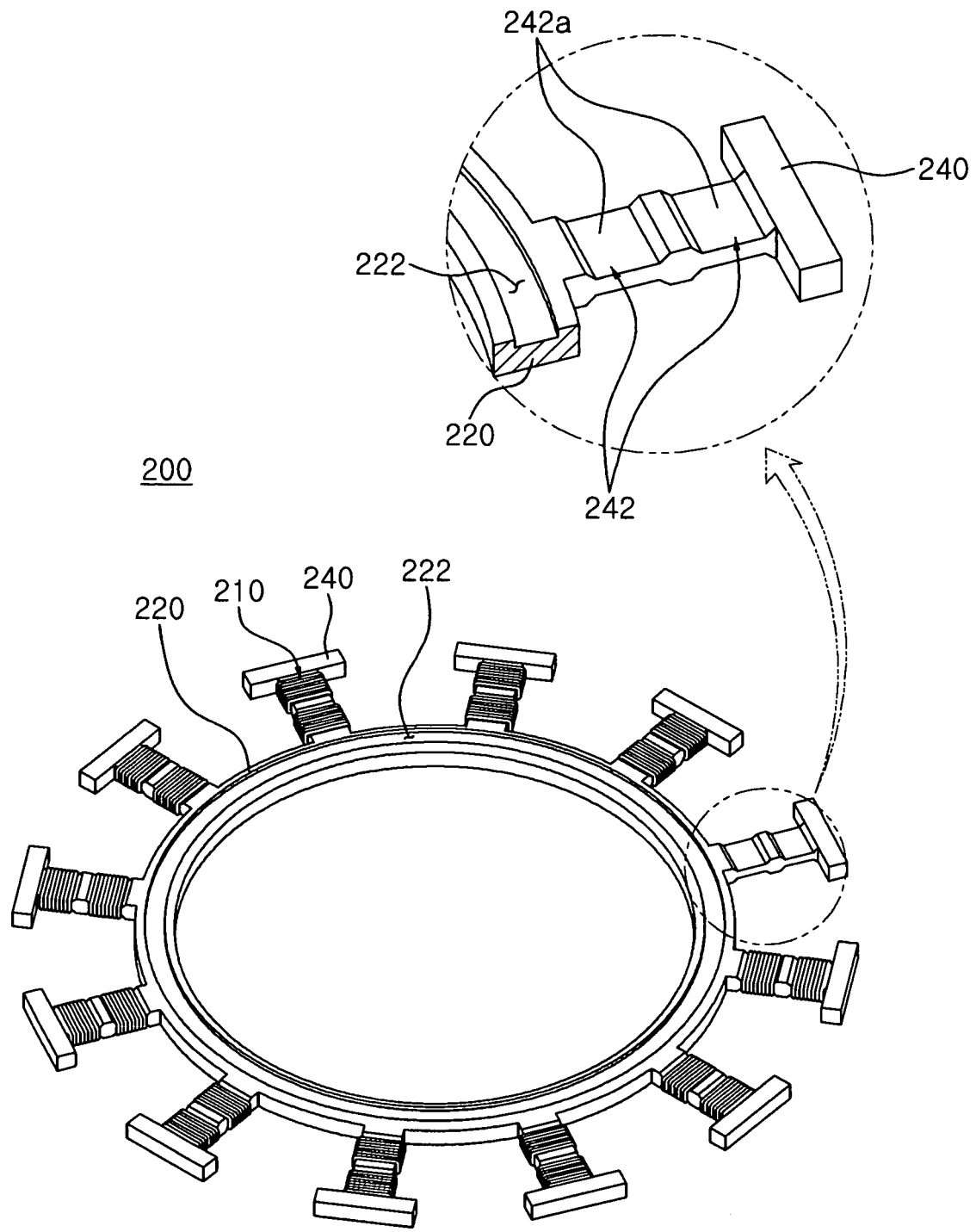
FIG. 4 is a perspective view illustrating a stator core according to another exemplary embodiment of the present invention.

FIG. 3 is a cross-sectional view illustrating a spindle motor including a stator core according to another exemplary embodiment of the present invention. FIG. 4 is a perspective view illustrating a stator core according to another exemplary embodiment of the present invention.

With reference to FIGS. 3 and 4, a stator core 200 according to another exemplary embodiment of the invention includes a core back 220 and teeth portions 240.

The core back 220 has an opening into which a stationary member 25 is pressed and fitted. As an example, the opening may be positioned at the center of the core back 220. The core back 220 may have the shape of a ring.

However, the shape of the core back 220 and the position of the opening are not limited thereto, and may be modified in various manners.

Also, a receiving recess 222 may be formed in the core back 220 in such a manner that a pulling magnet 30 preventing the lifting of a rotor case 50 may be disposed around the opening.

That is, the receiving recess 222, in which the pulling magnet 30 is pressed and fitted, may be formed on the upper surface of the core back 220. The receiving recess 222 leads to an increase in the distance between the pulling magnet 30 and the rotor case 50 as compared with the above-described embodiment of FIG. 1. Accordingly, the present embodiment allows the rotor case 50 to be installed downwardly in an axial direction so that the entire size of a motor may thereby be miniaturized.

The teeth portions 240 in this embodiment correspond to the teeth portions 140 described in the above-described embodiment, so a detailed description thereof will be omitted and only the differences therebetween will be described below.

A coil 210 may be wound around a winding recess 242 of each teeth portion 240 in order not to be protruded relative to the pulling magnet 30 pressed and fitted into the receiving recess 222 provided in the core back 220. That is, in order to reduce the height of the wound coil 210, the coil 210 may be wound around the winding recess 242 in order that it may have a height lower than the upper surface of the pulling magnet 30.

Also, the coil 210 may be wound around the inside of the winding recess 242.

As described above, the stator core 200 according to this embodiment of the invention has the effect of the stator core 100 according to the above-described embodiment and also achieves the miniaturization of a motor. That is, due to the receiving recess 222, the distance between the pulling magnet 30 and the rotor case 50 in this embodiment is increased as compared with the above-described embodiment of FIG. 1, thereby disposing the rotor case 50 downwardly in an axial direction. This allows for a reduction in the entire size of the motor.

Hereinafter, a stator core according to another exemplary embodiment of the present invention will be described.

Figure 5:
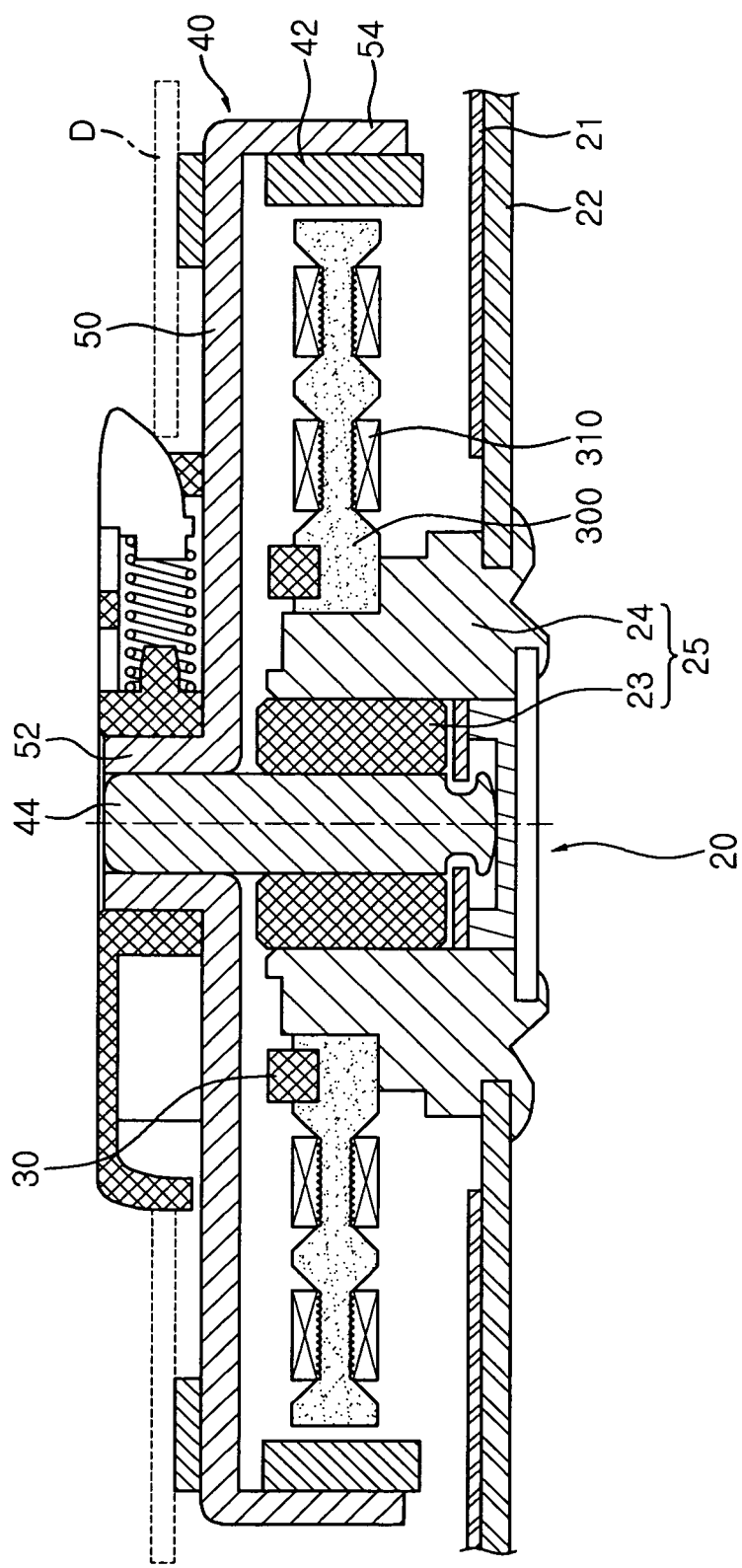
FIG. 5 is a cross-sectional view illustrating a spindle motor having a stator core according to another exemplary embodiment of the present invention.
Figure 6:
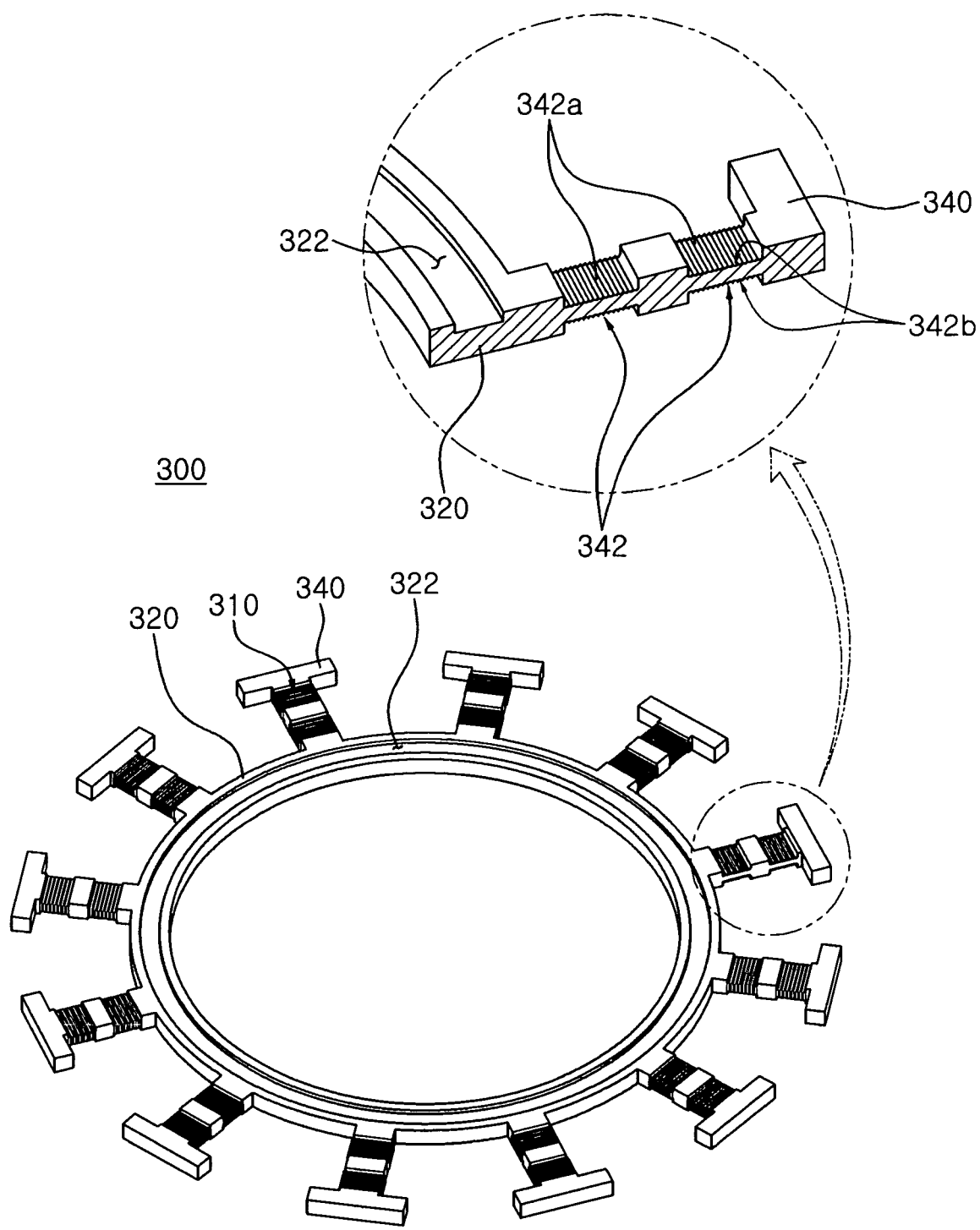
FIG. 6 is a perspective view illustrating a stator core according to another exemplary embodiment of the present invention.

FIG. 5 is a cross-sectional view illustrating a spindle motor including a stator core according to another exemplary embodiment of the present invention. FIG. 6 is a perspective view illustrating a stator core according to another exemplary embodiment of the present invention.

With reference to FIGS. 5 and 6, a stator core 300 according to another exemplary embodiment of the invention includes a core back 320 and teeth portions 340.

The core back 320 has an opening such that the core back 320 is fixed to a stationary member 25 by being pressed and fitted thereto. As an example, the opening, to which the stationary member 25 is pressed and fitted, may be positioned at the center of the core back 320. The core back 320 may have the shape of a ring.

However, the shape of the core back 320 and the position of the opening are not limited thereto, and may be modified in various manners. That is, the core back 320 and the opening may be modified so as to have various shapes, such as a square, a hexagon, or an octagon, according to the shape of the stationary member 25.

Meanwhile, a receiving recess 322 may be formed in the core back 320 in such a manner that a pulling magnet 30 preventing the lifting of a rotor case 50 may be disposed around the opening.

That is, the receiving recess 322, in which the pulling magnet 30 is pressed and fitted, may be formed on the upper surface of the core back 320. The receiving recess 322 leads to an increase in the distance between the pulling magnet 30 and the rotor case 50 as compared with the above-described embodiment of FIG. 1. Accordingly, the present embodiment allows the rotor case 50 to be installed downwardly in an axial direction so that the entire size of a motor may thereby be miniaturized.

The plurality of teeth portions 340 are protruded from the core back 320 in a radial direction. Each teeth portion 340 includes a winding recess 342 around which a coil 310 is wound.

That is, the coil 310 is wound around the winding recess 342 of the teeth portion 340 so that the height of the wound coil 310 may be reduced. In other words, as compared with a case in which a coil is wound around a teeth portion that does not include a winding recess, the stator core 300 including the winding recess 342 according to this embodiment may reduce the height of the wound coil 310.

As an example, the coil 310 may be wound around the winding recess 342 in order not to be protruded relative to the pulling magnet 30 pressed and fitted into the receiving recess 322 provided in the core back 320.

That is, in order to reduce the height of the wound coil 310, the coil 310 may be wound around the winding recess 342 in order that it may have a height lower than the upper surface of the pulling magnet 30.

The side surfaces of the winding recess 342 are disposed at right angles with relation to a bottom surface 342a of the winding recess 342 so as to prevent the wound coil 310 from being separated from the winding recess 342.

Further, since the side surfaces of the winding recess 342 are disposed at right angles with relation to the bottom surface 342a of the winding recess 342, the winding of the coil 310 may be facilitated. That is, the coil 310, while being wound around the winding recess 342, is prevented from being separated outwardly from the winding recess 342.

Meanwhile, a coil recess 342b is provided in the bottom surface 342a of the winding recess 342 in such a manner that the coil recess 342b has the wound coil 310 inserted thereinto. That is, the coil 310 may be wound along the coil recess 342b so that the winding of the coil 310 may be facilitated.

Also, the core back 320 and the teeth portion 340 is formed by a sintering process, and accordingly, the receiving recess 322 of the core back 320 and the winding recess 342 of the teeth portion 340 may be formed more easily.

That is, as compared with a case in which several core sheets made of silicon steel are individually pressed and then stacked, the core back 320 and the teeth portion 340 are formed by a sintering process so that the receiving recess 322 and the winding recess 342 may be formed more easily.

Further, since the teeth portion 340 is formed by the sintering process, the coil recess 342b provided in the bottom surface 342a of the winding recess 342 may also be formed more easily.

Meanwhile, since the core back 320 and the teeth portion 340 are formed by the sintering process, this may allow for variations in the shape of the receiving recess 322, the winding recess 142 and the coil recess 342b. That is, the receiving recess 322 and the winding recess 142 may be formed so as to be continuous or to be divided into plural parts, and the shapes thereof may be freely modified.

As described above, in the stator core 300 according to this embodiment, the coil 310 may be more easily wound around the inside of the winding recess 342. Further, the wound coil 310 may be prevented from being separated from the winding recess 342 during the winding of the coil 310.

In the stator core 300 according to this embodiment, since the core back 320 and the teeth portion 340 are formed by the sintering process, the shapes thereof may be freely modified. Also, it may be easier to form the winding recess 342 in the teeth portion 340 and to form the coil recess 342b in the bottom surface 342a of the winding recess 342.

Hereinafter, a spindle motor according to an exemplary embodiment of the present invention will be described with reference to the above-described drawings.

With reference to FIG. 1, a spindle motor 10 according to an exemplary embodiment of the invention includes a stator 20 and a rotor 40.

The stator 20 is constituted of stationary parts excepting rotating parts. The stator 20 includes a base plate 22 on which a printed circuit board (PCB) 21 is mounted, the stationary member 25 consisting of a sleeve 23 and a sleeve holder 24, and the stator core 100 installed to be fixed by the stationary member 25.

The rotor 40 includes the rotor case 50 having the shape of a cup, and a magnet 42 having the shape of a ring corresponding to the stator core 100 and disposed on an inner circumferential surface of the rotor case 50. The magnet 42 may be a permanent magnet having magnetic north and south poles magnetized alternately in a circumferential direction to generate a magnetic force having a predetermined magnitude.

The rotor case 50 includes a rotor hub 52 coupled with a shaft 44 to be pressed and fitted thereinto and a magnet coupling portion 54 having the ring-shaped magnet 42 disposed on an inner surface thereof.

Meanwhile, the rotor 40 rotates by electromagnetic interaction between the ring-shaped magnet 42 and the coil 110 wound around the stator core 100. In other words, when the rotor case 50 of the rotor 40 rotates, the shaft 44 interlocked with the rotor case 50 rotates.

As explained in detail in relation to the stator core 100 according to the above-described embodiment of the invention, the stator core 100 includes the core back 120 and the teeth portions 140.

The core back 120 has an opening such that the core back 120 is fixed to the stationary member 25 by being pressed and fitted thereto. As an example, the opening, to which the stationary member 25 is pressed and fitted, may be positioned at the center of the core back 120. The core back 120 may have the shape of a ring.

The plurality of teeth portions 140 are protruded from the core back 120 in the radial direction. Each teeth portion 140 includes the winding recess 142 around which the coil 110 is wound.

Meanwhile, since the coil 110 is wound around the winding recess 142 of the teeth portion 140, the height of the wound coil 110 may be reduced. That is, as compared with a case in which a coil is wound around a teeth portion that does not include a winding recess, the stator core 100 including the winding recess 142 according to this embodiment may reduce the height of the wound coil 110.

As an example, the coil 110 may be wound around the inside of the winding recess 142, and thus the height of the wound coil 110 may be reduced.

The winding recess 142 may be inclined towards the outer surface of the teeth portion 140 from the bottom surface 142*a* of the winding recess 142 so as to facilitate the winding of the coil 110.

That is, the winding recess 142 may be inclined towards the upper and lower surfaces of the teeth portion 140 from the bottom surface 142*a* of the winding recess 142 such that the coil 110 may be more easily wound around the inside of the winding recess 142.

Further, since the winding recess 142 is inclined towards the upper and lower surfaces of the teeth portion 140 from the bottom surface 142*a*, this may prevent the wound coil 110 from being separated from the winding recess 142.

Meanwhile, the core back 120 and the teeth portion 140 are formed by a sintering process, and accordingly, the winding recess 142 of the teeth portion 140 may be formed more easily.

That is, as compared with a case in which several core sheets made of silicon steel are individually pressed and then stacked, the core back 120 and the teeth portion 140 are formed by the sintering process so that the winding recess 142 may be formed more easily.

In addition, the sintering process may facilitate variations in the shape of the winding recess 142. That is, the winding recess 142 may be formed so as to be continuous or to be divided into plural parts, and the shape of the winding recess 142 may be freely modified.

As described above, the coil 110 is wound around the winding recess 142 so that the height of the wound coil 110 may be reduced, and accordingly, the entire thickness of the spindle motor 10 may be reduced.

Meanwhile, the present embodiment of the invention may describe, by way of example, the case in which the stator core 100 is installed in the spindle motor 10. However, the invention is not limited thereto. In the spindle motor 10, the stator core 200 or 300 according to another exemplary embodiment as depicted in FIG. 3 or 5 may be installed.

As set forth above, in a stator core according to an exemplary embodiment of the invention, a coil is wound around a winding recess so that the height of the wound coil may be reduced.

Also, the winding recess is inclined towards upper and lower surfaces of a teeth portion so that the coil may be more easily wound around the inside of the winding recess. Further, the wound coil may be prevented from being separated from the winding recess.

In addition, in the stator core according to the embodiment of the invention, a core back and the teeth portion are formed by a sintering process so that the shapes thereof may be freely modified. Further, it may be easier to form the winding recess in the teeth portion.

A stator core according to another exemplary embodiment of the invention has the effect of the stator core according to the above-described embodiment and also achieves a reduction in the entire size of the motor in such a manner that since the distance between a pulling magnet and a rotor case is increased due to a receiving recess in which the pulling magnet is fitted, the rotor case is installed downwardly in an axial direction.

In a stator core according to another exemplary embodiment of the invention, a coil is wound around a winding recess having side surfaces disposed at right angles with relation to a bottom surface so that the coil may be more easily wound around the inside of the winding recess. Further, the wound coil may be prevented from being separated from the winding recess.

Also, in the stator core according to another exemplary embodiment of the invention, a core back and a teeth portion are formed by a sintering process so that a coil recess may be formed in the bottom surface of the winding recess.

Accordingly, the coil is wound to be inserted into the coil recess so that the winding of the coil may be facilitated.

While the present invention has been shown and described in connection with the exemplary embodiments, it will be apparent to those skilled in the art that modifications and variations can be made without departing from the spirit and scope of the invention as defined by the appended claims.

What is claimed is:

1. A stator core comprising:
    a core back having an opening such that the core back is fixed to a stationary member by being pressed and fitted thereto; and
    a plurality of teeth portions being protruded from the core back in a radial direction, each teeth portion including a winding recess around which a coil is wound,
    the core back and the teeth portions formed by a sintering process,
    the core back having a receiving recess allowing a pulling magnet mounted therein to be disposed around the opening, the pulling magnet preventing lifting of a rotor, and
    the coil wound around the winding recess having a height lower than that of the pulling magnet mounted in the receiving recess.

2. The stator core of claim 1, wherein the winding recess has side surfaces inclined from a bottom surface towards an outer surface of the teeth portion in order to facilitate the winding of the coil.

3. The stator core of claim 1, wherein the winding recess has side surfaces disposed at right angles with relation to a bottom surface in order to prevent the wound coil from being separated.

4. The stator core of claim 1, wherein the winding recess has a series of coil recesses formed in a bottom surface thereof such that the coil is wound to be inserted into the coil recess.

5. A spindle motor comprising:
a base plate;
a stationary member fixed to the base plate; and
a stator core comprising
a core back having an opening such that the core back is fixed to the stationary member by being pressed and fitted thereto, and
a plurality of teeth portions being protruded from the core back in a radial direction, each teeth portion including a winding recess around which a coil is wound,
the core back and the teeth portions formed by a sintering process,
the core back having a receiving recess allowing a pulling magnet mounted therein to be disposed around the opening, the pulling magnet preventing lifting of a rotor, and
the coil wound around the winding recess having a height lower than that of the pulling magnet mounted in the receiving recess.

6. The spindle motor of claim 5, wherein the winding recess has side surfaces inclined from a bottom surface towards an outer surface of the teeth portion in order to facilitate the winding of the coil.

7. The spindle motor of claim 5, wherein the winding recess has side surfaces disposed at right angles with relation to a bottom surface in order to prevent the wound coil from being separated.

8. The spindle motor of claim 5, wherein the winding recess has a series of coil recesses formed in a bottom surface thereof such that the wound coil corresponds to the coil recess.

* * * * *